US008452115B2

(12) United States Patent
Chen et al.

(10) Patent No.: US 8,452,115 B2
(45) Date of Patent: May 28, 2013

(54) METHOD AND APPARATUS FOR DESIGNING RESTORATION FILTER, AND METHOD AND APPARATUS FOR RESTORING IMAGE USING THE RESTORATION FILTER

(75) Inventors: Po-Chang Chen, Taipei County (TW); Chih-Hao Liu, Taichung (TW); Chuan-Chung Chang, Hsinchu County (TW); Ludovic Angot, Hsinchu (TW); Chir-Weei Chang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 744 days.

(21) Appl. No.: 12/647,521

(22) Filed: Dec. 27, 2009

(65) Prior Publication Data

US 2010/0183235 A1    Jul. 22, 2010

(30) Foreign Application Priority Data

Jan. 17, 2009   (TW) .............................. 98101785 A

(51) Int. Cl.
    *G06K 9/40*         (2006.01)
(52) U.S. Cl.
    USPC ......................................... 382/254; 382/260

(58) Field of Classification Search
    USPC ................. 382/112, 162, 230, 204, 254, 255, 382/260, 261, 278, 287, 291
    See application file for complete search history.

(56) References Cited

U.S. PATENT DOCUMENTS

| 6,166,853 A | 12/2000 | Sapia et al. |
| 6,285,799 B1 | 9/2001 | Dance et al. |
| 7,190,395 B2 * | 3/2007 | Nakano et al. ................ 348/241 |
| 7,228,005 B1 * | 6/2007 | Yuan .............................. 382/280 |
| 8,098,948 B1 * | 1/2012 | Tzur et al. ..................... 382/255 |

* cited by examiner

*Primary Examiner* — Phuoc Tran
(74) *Attorney, Agent, or Firm* — Jianq Chyun IP Office

(57) ABSTRACT

A method and an apparatus for designing an image restoration filter and a method and an apparatus for restoring an image by using the image restoration filter are provided. A test image is captured by an imaging system to obtain image information of the test image. The image restoration filter is then calculated according to original image information of the test image and the image information obtained by the imaging system through a numerical method, such that the obtained image information after being processed by the image restoration filter has a better similarity to the original image information. Thereafter, an image captured by the imaging system is processed by using the image restoration filter as a kernel, so as to resolve the problems of image blur and distortion caused by the optical path and the imaging system.

23 Claims, 13 Drawing Sheets

METHOD AND APPARATUS FOR DESIGNING RESTORATION FILTER, AND METHOD AND APPARATUS FOR RESTORING IMAGE USING THE RESTORATION FILTER

CROSS-REFERENCE TO RELATED APPLICATION

This application claims the priority benefit of Taiwan application serial no. 98101785, filed on Jan. 17, 2009. The entirety of the above-mentioned patent application is hereby incorporated by reference herein and made a part of this specification.

BACKGROUND OF THE INVENTION

1. Technical Field

The disclosure generally relates to a method and an apparatus for processing an image, and more particularly, to a method and an apparatus for designing a restoration filter and a method and an apparatus for restoring an image by using the restoration filter.

2. Background

The requirement of consumers to image quality has been increasing along with the widespread of digital cameras and digital camcorders. However, the image quality may be seriously affected by unresolved imaging defects in optical designs, lens errors, nonlinear characteristics and noises of sensors, and incorrect focusing or tuning at the time of image capturing.

Generally speaking, an optical system or imaging system can be represented with a point spread function (PSF), and an image captured by a sensor can be obtained through the convolution of an input image and the PSF of the imaging system. An image formed on the sensor through the optical system is referred to the ideal image if the PSF is an ideal impulse function or its size is approximately equal to a pixel of the sensor. However, in an actual application, the PSF may be enlarged due to diffraction limit, aberration, and incorrect focusing. Accordingly, the bandwidth of the imaging system may be reduced so that the image captured by the imaging system is blurred.

Conventionally, a Wiener filter is usually adopted for processing a captured image, and an inverse filter in the frequency domain is designed by using the PSF of the imaging system, so as to resolve the problem of image blur. However, in this method, the PSF model of the imaging system and the signal-to-noise ratio (SNR) thereof have to be obtained. If either parameter is not precisely obtained, the image restoration performance may be reduced, or noises may even be increased due to improper design.

SUMMARY

According to one embodiment, an image restoration method for calculating a restoration filter of an imaging system is disclosed. In the image restoration method, first image information of a test image is obtained, wherein the first image information contains pixel values of a plurality of pixels in the test image. Then, second image information is obtained by capturing the test image from an image sensor of the imaging system. Thereafter, the restoration filter is calculated according to the first image information and the second image information through a numerical method, such that the second image information after being processed by the restoration filter has a better similarity to the first image information.

According to another embodiment, a restoration filter design apparatus including a calculation unit and a storage unit is disclosed. The calculation unit receives first image information of a test image and second image information obtained by capturing the test image from an image sensor of an imaging system, and the calculation unit calculates at least a set of parameters of a restoration filter according to the first image information and the second image information through a numerical method, such that the second image information after being processed by the restoration filter has a better similarity to the first image information. The storage unit is coupled to the calculation unit for recording the parameters of the restoration filter calculated by the calculation unit.

According to another embodiment, an image restoration method for calculating a restoration filter of an imaging system and restoring an image captured by the imaging system by using the restoration filter is disclosed. In the image restoration method, first image information of a test image is obtained, wherein the first image information contains pixel values of a plurality of pixels in the test image. Then, second image information is obtained by capturing the test image from an image sensor of the imaging system. Next, the restoration filter is calculated according to the first image information and the second image information through a numerical method, such that the second image information after being processed by the restoration filter has a better similarity to the first image information. Finally, a captured image is restored by using the restoration filter, so as to obtain a restored image of the captured image.

According to another embodiment, an image restoration apparatus including a storage unit, a calculation unit, and a restoration processing unit is disclosed. The calculation unit receives first image information of a test image and second image information obtained by capturing the test image from an image sensor of an imaging system, and the calculation unit calculates at least a set of parameters of a restoration filter according to the first image information and the second image information through a numerical method, such that the second image information after being processed by the restoration filter has a better similarity to the first image information. The storage unit is coupled to the calculation unit for recording the parameters of the restoration filter calculated by the calculation unit. The restoration processing unit is coupled to the storage unit and the imaging system. The restoration processing unit restores an image captured by the imaging system by using the parameters recorded in the storage unit, so as to obtain a restored image of the captured image.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
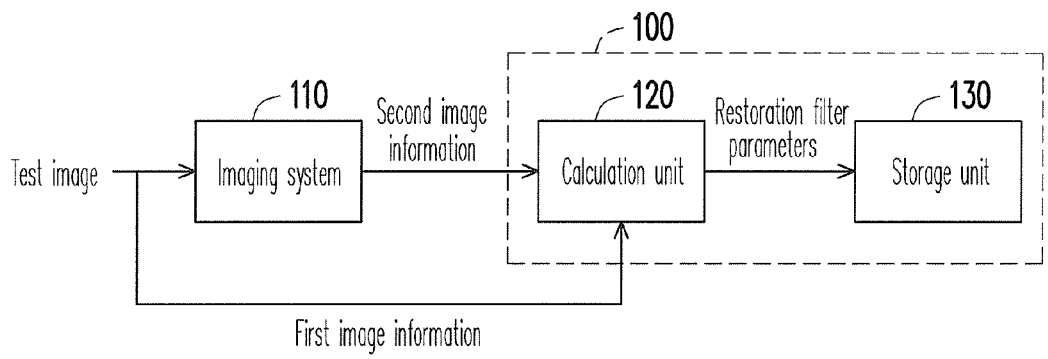
FIG. 1 is a block diagram of a restoration filter design apparatus according to a first embodiment of the present invention.
Figure 2:
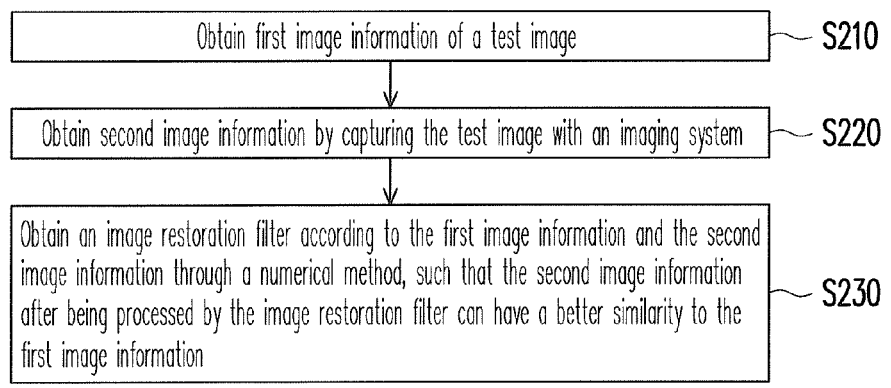
FIG. 2 is a flowchart of a restoration filter design method according to the first embodiment of the present invention.

FIG. 1 is a block diagram of a restoration filter design apparatus according to a first embodiment, and FIG. 2 is a flowchart of a restoration filter design method according to the embodiment. Referring to both FIG. 1 and FIG. 2 in the present embodiment, the restoration filter design apparatus 100 includes a calculation unit 120 and a storage unit 130, and the restoration filter design apparatus 100 is used for calculating at least a set of parameters of a restoration filter of an imaging system 110, wherein the restoration filter is used for restoring an image captured by the imaging system 110.

Figure 3:
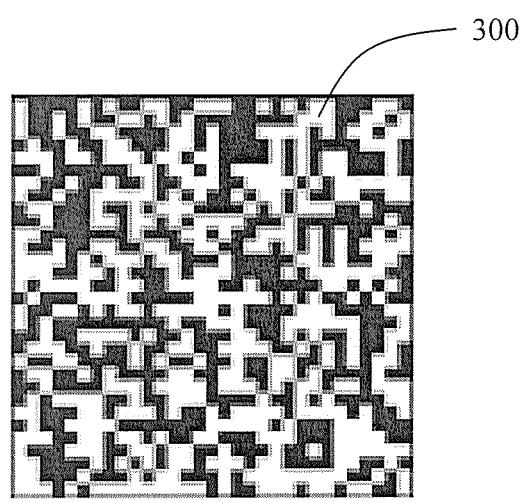
FIG. 3 illustrates a test image according to the first embodiment of the present invention.

In the present embodiment, the test image 300 illustrated in FIG. 3 is served as the test image of the restoration filter design apparatus 100. The test image 300 is an identification pattern which is constructed by using pseudo-random data. The test image 300 may have a rectangular shape, a square shape, a circular shape, or a polygonal shape. The test image 300 may be composed of dots, blocks, circles, strips, or other geometrical shapes, and the pixel values of these components may have binary values or gray scale values. In addition, the color of these components may be black/white, gray scale, or multicolor. However, the shape, color, and pixel values of the components are not limited. Since a random signal carries rich information, it is suitable to be the test image for the imaging system 110. Accordingly, using the test image as the input of the imaging system would be good for the restoration filter design apparatus 100 to calculate the restoration filter. However, in an actual application, the test image is not limited to being constructed of pseudo-random data. Instead, the test image may also be constructed by using testing dots, scenery images, or human face images commonly used in image processing as long as the digital information of the images is available or can be obtained. The restoration filter design method in the present embodiment will be described below.

First, first image information of the test image is obtained (step S210). The first image information may be an original test image file received externally which contains pixel values of a plurality of pixels in the test image.

Then, second image information is obtained by capturing the test image 300 from an image sensor of the imaging system 110 (step S220). The test image 300 may be a pattern printed by a printer or an image displayed on a monitor of a computer by loading the original image information of the test image into the computer and then captured by the physical imaging system 110. The second image information captured by the imaging system 110 may be blurred by the point spread function (PSF) of the imaging system 110. The difference between the first image information and the second image information is that the former is a clear image unaffected by the imaging system 110, and the latter is blurred by the PSF of the imaging system 110.

In order to reduce the affection of noises, in an embodiment, a plurality of pieces of image information of the test image 300 are obtained by capturing the test image 300 a plurality of times with the imaging system 110, and an average value of the plurality of pieces of image information is then calculated and served as the second image information.

Thereafter, the calculation unit 120 receives the original first image information of the test image 300 and the second image information captured by the imaging system 110 and then calculates at least a set of parameters of a restoration filter according to foregoing information through a numerical method (step S230). After that, the parameters of restoration filter are output by the calculation unit 120 and stored into the storage unit 130 to be used in subsequent image restoration.

The calculation unit 120 calculates the parameters of the restoration filter of the imaging system 110 according to the first image information and the second image information through a minimum mean square error (MMSE) method, an iterative least mean square (ILMS) method, a minimum distance (MD) method, a maximum likelihood (ML) method, or a maximum entropy (ME) method, such that the second image information captured by the imaging system 110 and after being processed by the restoration filter has a better similarity to the first image information.

In short, the restoration filter design apparatus 100 in the present embodiment is to design a restoration filter for restoring a captured image into an image having the better similarity to the original image so as to reduce the blur or noises produced when the imaging system 110 captures the image.

For example, the calculation unit 120 computes the parameters of a restoration filter W in the spatial domain through the MMSE method such that a blur image B output by the imaging system 110 can be restored into an image similar to the original image I after it is processed by the restoration filter W. Because a mean square error (MSE) is used as a measurement index in the MMSE method, both the blur and noise problem can be resolved by minimizing the MSE through the restoration filter W. Assuming the blur image is B, the restoration filter is W, and the image output by the restoration filter is $\hat{I}$ ($\hat{I}$ may also be considered as an estimate of the original image I), it can be obtained through following convolution:

$$\hat{I}(i, j) = \sum_{k=1}^{m} \sum_{l=1}^{n} B(i+k, j+l) W(k, l) \quad (1)$$

wherein the variables within the brackets (for example, i and j) represent the index of rows and columns of the image or matrix, and m and n represent the dimensions of the restoration filter W. Foregoing image may be in black/white, gray scale, or multicolor, and the pixel values thereof may be values of any of R channel, G channel, and B channel or values of any channel in the YUV, Luv, YIQ, or any other color space. To obtain the restoration filter through the MMSE method, in the present embodiment, the following performance index J is defined:

$$J = E\{(I(i,j) - \hat{I}(i,j))^2\} \quad (2)$$
$$= E\{I^2(i,j)\} - 2E\{I(i,j)\hat{I}(i,j)\} + E\{\hat{I}^2(i,j)\}$$

wherein the equation (2) is the MSE of the pixel values. By substituting the equation (1) into the equation (2) and performing a partial differentiation to W(k,l), we can have:

$$\frac{\partial J}{\partial W(k,l)} = -2E\{I(i,j)B(i+k,j+l)\} + 2\sum_{p=1}^{m}\sum_{q=1}^{n} E\{B(i+p,j+q)B(i+k,j+l)\}W(p,q) \quad (3)$$

for k=1, 2, ..., m, and l=1, 2, ..., n. If an autocorrelation $R_{BB}$ and a cross-correlation $R_{IB}$ are defined as follows:

$$R_{BB}(k-p, l-q) = E\{B(i+p,j+q)B(i+k,j+l)\} \quad (4)$$

$$R_{IB}(k,l) = E\{I(i,j)B(i+k,j+l)\} \quad (5)$$

Then foregoing equation (3) can be revised as:

$$\frac{\partial J}{\partial W(k,l)} = -2R_{IB}(k,l) + 2\sum_{p=1}^{m}\sum_{q=1}^{n} R_{BB}(k-p, l-q)W(p,q) \quad (6)$$

for k=1, 2, ..., m, and l=1, 2, ..., n. Assuming the equation (6) is zero for solving the MMSE filter W, then we have:

$$R_{IB}(k,l) = \sum_{p=1}^{m}\sum_{q=1}^{n} R_{BB}(k-p, l-q)W(p,q) \quad (7)$$

for k=1, 2, ..., m, and l=1, 2, ..., n. Foregoing equation (7) can be further rewritten as:

$$\overline{r}_{IB} = R_{BB}\overline{w} \quad (8)$$

wherein $\overline{r}_{IB}$ and $\overline{w}$ are respectively vectors composed of $R_{IB}$ and W, and $R_{BB}$ is a square matrix consisting of $R_{BB}$. The $\overline{w}$ can be rearranged to obtain W. Thus, the restoration filter $\overline{w}$ can be computed as:

$$\overline{w} = R_{BB}^{-1}\overline{r}_{IB} \quad (9)$$

Finally, the autocorrelation matrix $R_{BB}$ and the cross-correlation vector $\overline{r}_{IB}$ can be obtained by using the first image information of the test image and the corrected second image information, and the restoration filter $\overline{w}$ or W can be calculated accordingly.

The method described above for calculating the restoration filter through the MMSE method is only an example of the numerical method adopted in the present embodiment but not for limiting the scope of the same. Other numerical methods (for example, ILMS, MD, ML, or ME) may also be adopted for calculating the restoration filter of the imaging system 110 by those skilled in the art.

Figure 4:
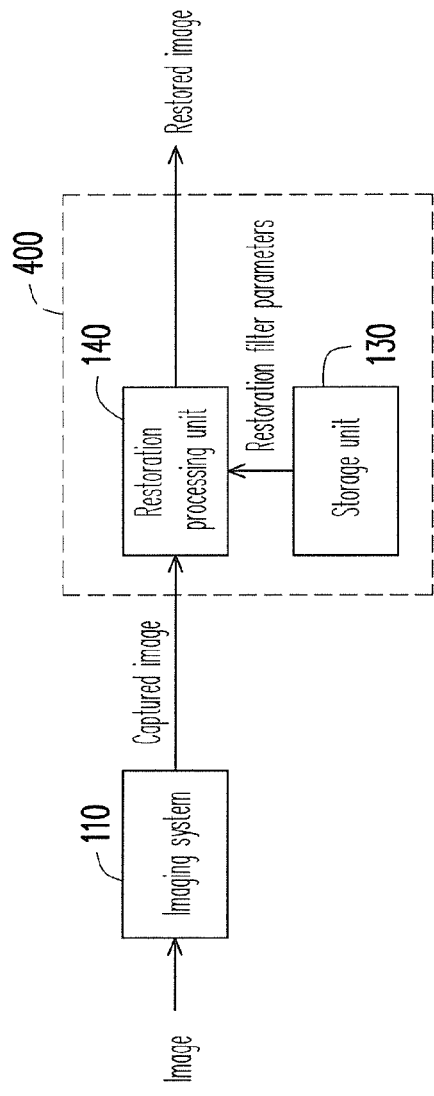
FIG. 4 is a block diagram of an image restoration apparatus according to the first embodiment of the present invention.

The parameters of the restoration filter stored in the storage unit 130 may be further loaded into a restoration processing unit to form an image restoration apparatus, so as to restore an image captured by the imaging system. FIG. 4 is a block diagram of an image restoration apparatus according to the first embodiment. Referring to FIG. 4, in the present embodiment, the image restoration apparatus 400 loads the parameters of the restoration filter stored in the storage unit 130 of the restoration filter design apparatus 100 into a restoration processing unit 140, and the restoration processing unit 140 restores images captured by the imaging system 110. The restoration processing unit 140 may be a restoration filter kernel and the restoration processing unit 140 can restore a received image after the parameters of a restoration filter are loaded thereto.

The parameters of the restoration filter stored in the storage unit 130 are obtained by the restoration filter design apparatus 100. Thus, the restored image output by the restoration processing unit 140 is very similar to the original image. As a result, the image blur and noise can be reduced. It should be mentioned that in another embodiment, the restoration filter design apparatus 100 and the image restoration apparatus 400 may also be integrated into a single unit for designing a restoration filter and restoring images.

Figure 5:
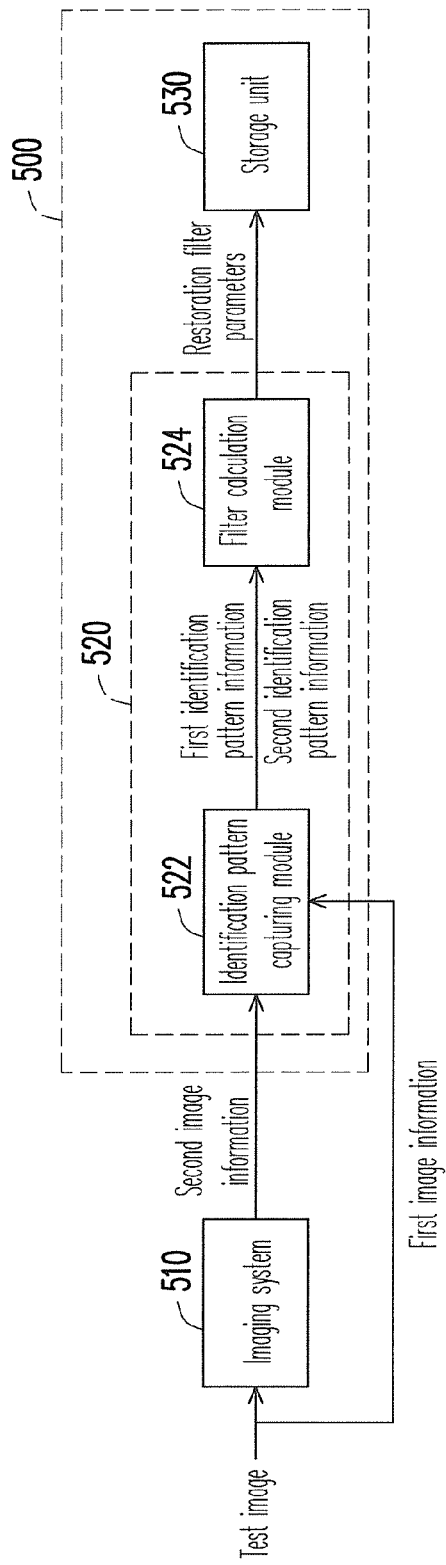
FIG. 5 is a block diagram of a restoration filter design apparatus according to a second embodiment of the present invention.
Figure 6:
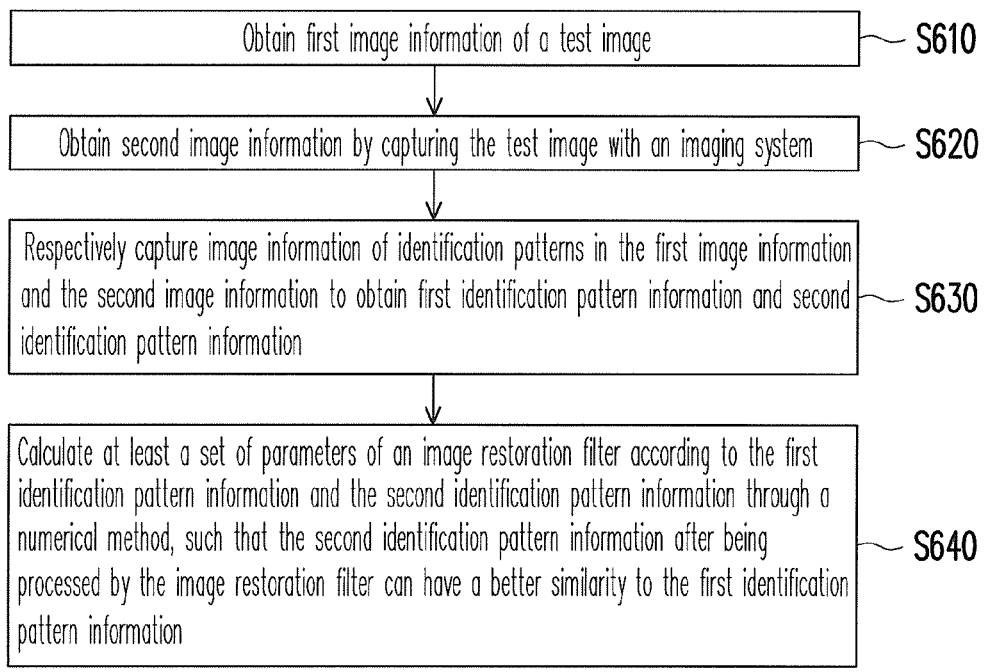
FIG. 6 is a flowchart of a restoration filter design method according to the second embodiment of the present invention.

FIG. 5 is a block diagram of a restoration filter design apparatus according to a second embodiment, and FIG. 6 is a flowchart of a restoration filter design method according to the embodiment. Referring to both FIG. 5 and FIG. 6, in the present embodiment, the restoration filter design apparatus 500 includes a calculation unit 520 and a storage unit 530 for calculating a restoration filter of an imaging system 510, so as to restore images captured by the imaging system 510. The calculation unit 520 can be further divided into an identification pattern capturing module 522 and a filter calculation module 524.

Figure 7:
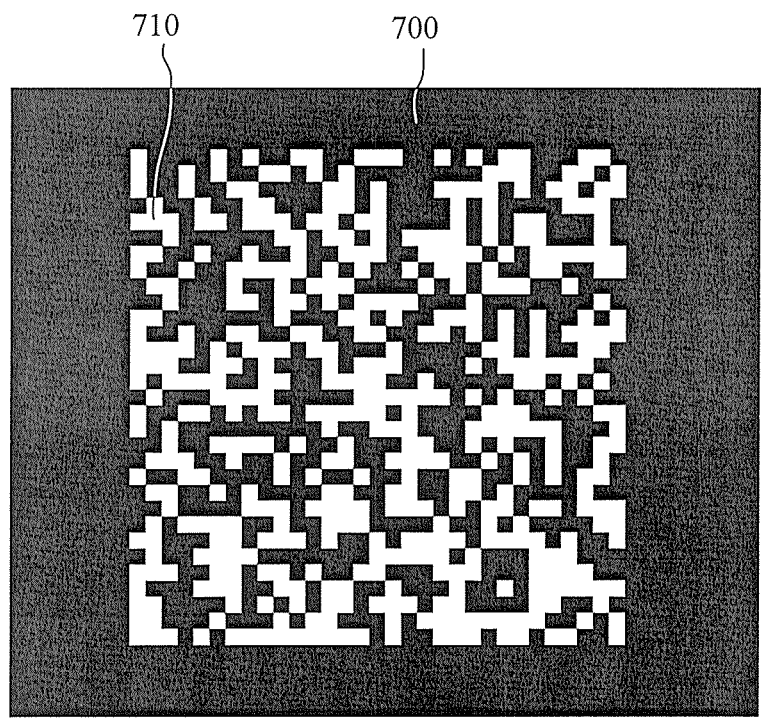
FIG. 7 illustrates a test image according to the second embodiment of the present invention.

In the present embodiment, the test image 700 illustrated in FIG. 7 is used as the test image of the restoration filter design apparatus 500. The test image 700 contains an identification pattern 710 which is constructed by using pseudo-random data. The test image 700 may be in rectangular shape, square shape, circular shape, or any polygonal shape and may be composed of dots, blocks, circles, strips, or components of other geometrical shapes. The pixel values of foregoing components may be binary values or gray scale values. In addition, the colors of these components may be black/white, gray scale, or multicolour. In an actual application, the test image is not limited to being constructed of pseudo-random data. Instead, the test image may also be constructed by using testing dots, scenery images, or human face images commonly used in image processing as long as the digital information of the images already is available or can be obtained. The restoration filter design method in the present embodiment will be described below.

First, first image information of a test image is obtained (step S610). The first image information may be a test image file received externally and it contains pixel values of a plurality of pixels in the test image.

Then, second image information is obtained by capturing the test image 700 from an image sensor of the imaging system 510 (step S620). The test image 700 may be printed in advance and provided for the imaging system 510 to capture. The image information captured by the imaging system 510 is blurred by the PSF of the imaging system 510. In order to eliminate the affection of the noises, in an embodiment, a plurality of pieces of image information are obtained by capturing the test image 700 a plurality of times with the imaging system 510, and the plurality of pieces of image information are then averaged to obtain the second image information.

Thereafter, an identification pattern capturing module 522 in the calculation unit 520 receives the first image information of the test image 700 and the second image information output by the imaging system 510, and the identification pattern capturing module 522 respectively captures image information of the identification pattern 710 from foregoing first image information and second image information, so as to obtain first identification pattern information and second identification pattern information (step S630).

A filter calculation module 524 in the calculation unit 520 receives the first identification pattern information and the second identification pattern information from the identification pattern capturing module 522 and calculates at least a set of parameters of a restoration filter according to foregoing information through a numerical method, such that the second identification pattern information after being processed by the restoration filter has a better similarity to the first identification pattern information (step S640). Finally, the parameters of the restoration filter calculated by the filter calculation module 524 are output and stored in the storage unit 530 to be used in subsequent image restoration. The filter calculation module 524 calculates the restoration filter through a MMSE method, an ILMS method, a MD method, a ML method, or a ME method, etc, and the detail thereof has been explained in the first embodiment therefore will not be described herein.

Figure 8:
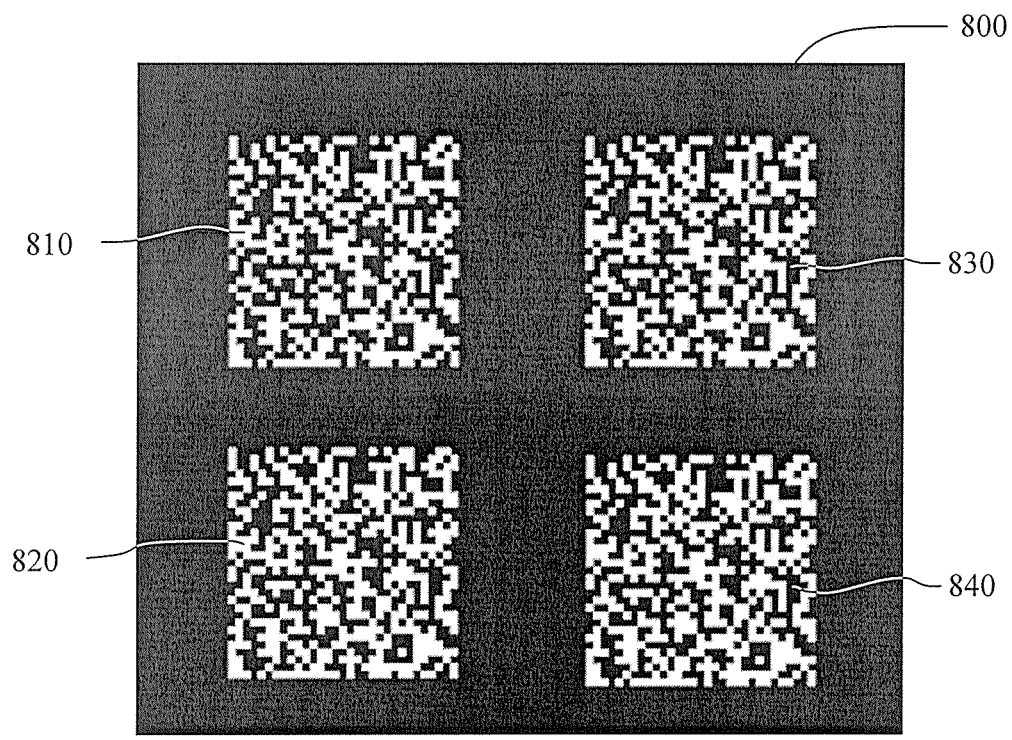
FIG. 8 illustrates a test image according to the second embodiment of the present invention.

To deal with the variation of the PSFs off axis, in an embodiment, a plurality of identification patterns may be disposed in the test image, such as the identification patterns 810, 820, 830, and 840 in the test image 800 (as shown in FIG. 8). Regarding such a test image, the identification pattern capturing module respectively captures the identification patterns 810, 820, 830, and 840 in the first image information and the second image information, and the filter calculation module 524 respectively calculates at least a set of parameters of a restoration filter for each region of the second image information containing an identification pattern. The parameters of each said restoration filter are computed according to each individual identification pattern of the first image information and each corresponding individual identification pattern of the second image information. The calculated restoration filters are then used for performing image restoration on the corresponding regions, respectively.

Figure 9:
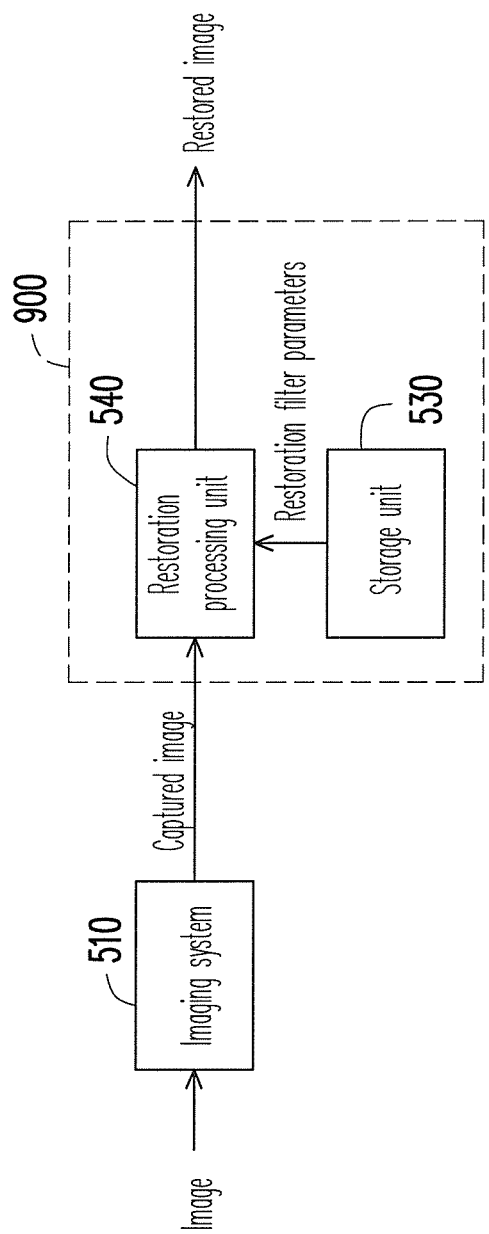
FIG. 9 is a block diagram of an image restoration apparatus according to the second embodiment of the present invention.

In addition, as described in the first embodiment, in the present embodiment, the restoration filter stored in the storage unit 530 may be further loaded into a restoration processing unit to form an image restoration apparatus, wherein the image restoration apparatus is used for restoring images captured by the imaging system 510. FIG. 9 is a block diagram of an image restoration apparatus according to the second embodiment. Referring to FIG. 9, in the present embodiment, the image restoration apparatus 900 loads the parameters of the restoration filter stored in the storage unit 530 of the restoration filter design apparatus 500 into a restoration processing unit 540, and the restoration processing unit 540 restores images captured by the imaging system 510. The restoration processing unit 540 may be a restoration filter kernel and the restoration processing unit 540 restores a received image after the parameters of the restoration filter are loaded.

The parameters of the restoration filter stored in the storage unit 530 are obtained by the restoration filter design apparatus 500. Thus, the restored image output by the restoration processing unit 540 is very similar to the original image. As a result, the image blur and noise can be reduced. It should be mentioned that in another embodiment, the restoration filter design apparatus 500 and the image restoration apparatus 900 may also be integrated into a single unit for designing a restoration filter and restoring images.

Figure 10:
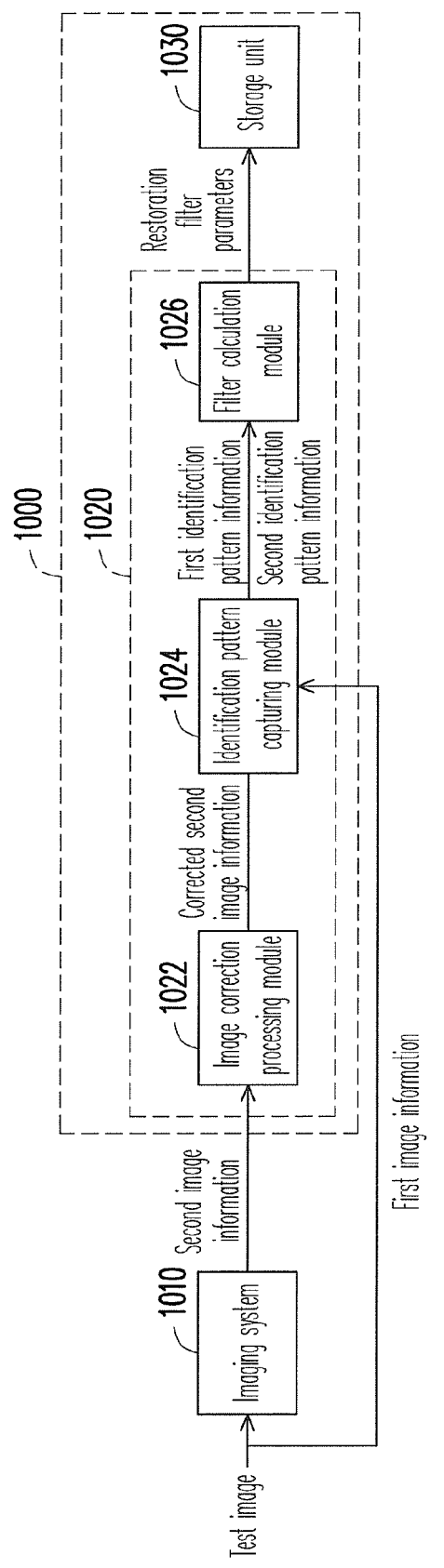
FIG. 10 is a block diagram of a restoration filter design apparatus according to a third embodiment of the present invention.
Figure 11:
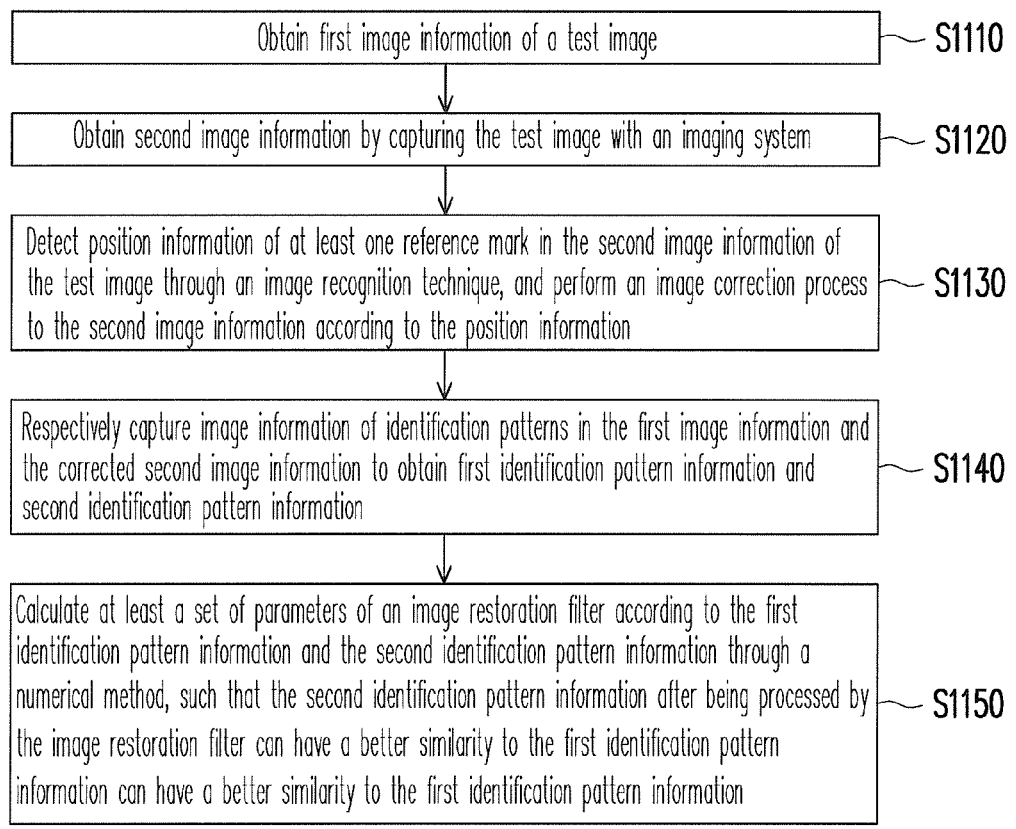
FIG. 11 is a flowchart of a restoration filter design method according to the third embodiment of the present invention.

FIG. 10 is a block diagram of a restoration filter design apparatus according to a third embodiment, and FIG. 11 is a flowchart of a restoration filter design method according to the third embodiment. Referring to both FIG. 10 and FIG. 11, in the present embodiment, the restoration filter design apparatus 1000 includes a calculation unit 1020 and a storage unit 1030 for calculating at least a set of parameters of a restoration filter of an imaging system 1010, so as to restore images captured by the imaging system 1010. The calculation unit 1020 may be further divided into an image correction processing module 1022, an identification pattern capturing module 1024, and a filter calculation module 1026.

Figure 12:
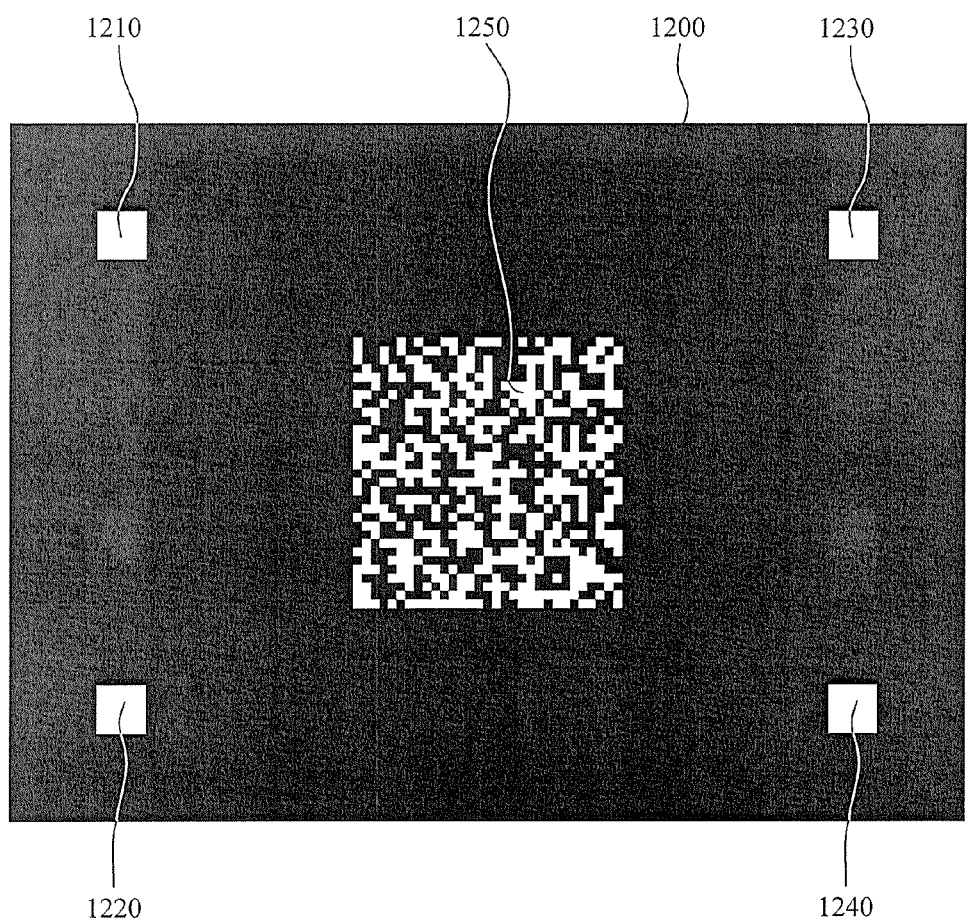
FIG. 12 illustrates a test image according to the third embodiment of the present invention.

In the present embodiment, the test image 1200 illustrated in FIG. 12 is used as the test image of the restoration filter design apparatus 1000. The test image 1200 contains four reference marks 1210, 1220, 1230, and 1240 and an identification pattern 1250. The reference marks 1210, 1220, 1230, and 1240 provide reference position information for correcting images. Generally speaking, the reference marks 1210, 1220, 1230, and 1240 are composed of a plurality of pixels, and the images or positions thereof are still easily identified despite of defects of the imaging system 1010. It should be mentioned that in the present embodiment, the reference marks 1210, 1220, 1230, and 1240 are square-shaped. However, in an actual application, the reference marks 1210, 1220, 1230, and 1240 may also be in circular shape, diamond-shape, or other solid or hollow shapes which are easily detected, and the shape of the reference marks 1210, 1220, 1230, and 1240 is not limited. The identification pattern 1250 is constructed by using pseudo-random data, and the appearance thereof may be rectangular, square, circular, or polygonal. The identification pattern 1250 is composed of dots, blocks, circles, strips, or other geometrical shapes, and the pixel values of these components may be binary values or gray scale values. In addition, the colors of foregoing components may be black/white, gray scale, or multicolour. However, the shape, color, and pixel values of the components are not limited in the present embodiment. In an actual application, the test image is not limited to being constructed of pseudo-random data. Instead, the test image may also be constructed by using testing dots, scenery images, or human face images commonly used in image processing as long as the digital information of the images already is available or can be obtained. The restoration filter design method in the present embodiment will be described below.

First, first image information of a test image is obtained (step S1110). The first image information may be a test image file received externally which contains the pixel values of a plurality of pixels in the test image.

Then, second image information is obtained by capturing the test image 1200 from an image sensor of the imaging system 1010 (step S1120). The test image 1200 may be printed in advance and provided for the imaging system 1010 to capture. The image information captured by the imaging system 1010 is blurred by the PSF of the imaging system 1010. In order to eliminate the affection of the noises, in an embodiment, a plurality of pieces of image information are obtained by capturing the test image 1200 a plurality of times with the imaging system 1010, and the plurality of pieces of image information are then averaged to obtain the second image information.

Thereafter, the image correction processing module 1022 in the calculation unit 1020 receives the second image information captured by the imaging system 1010 and performs an image correction process to the second image information (step S1130). The image correction process includes a spatial correction or a distortion correction. To be specific, the calculation unit 1020 detects the position information of reference marks in the second image information through an image recognition technique and performs a spatial correction or a distortion correction to the second image information according to the position information of the reference marks through a numerical method (for example, affine transformation or perspective transformation).

The identification pattern capturing module 1024 in the calculation unit 1020 receives the first image information of the test image 1200 and the corrected second image information from the image correction processing module 1022 and respectively captures the image information of the identification pattern 1250 from the first image information and the second image information, so as to obtain first identification pattern information and second identification pattern information (step S1140).

The filter calculation module 1026 in the calculation unit 1020 receives the first identification pattern information and the second identification pattern information from the identification pattern capturing module 1024 and calculates at least a set of parameters of a restoration filter according to the first identification pattern information and the second identification pattern information through a numerical method, such that the second identification pattern information after being processed by the restoration filter has a better similarity to the first identification pattern information (step S1150). Finally, the parameters of the restoration filter calculated by the filter calculation module 1026 are output and stored into the storage unit 1030 to be used in subsequent image restoration. The filter calculation module 1026 calculates the parameters of the restoration filter through a MMSE method, an ILMS method, a MD method, a ML method, or a ME method, and the detail has been described in the first embodiment therefore will not be described herein.

Figure 13:
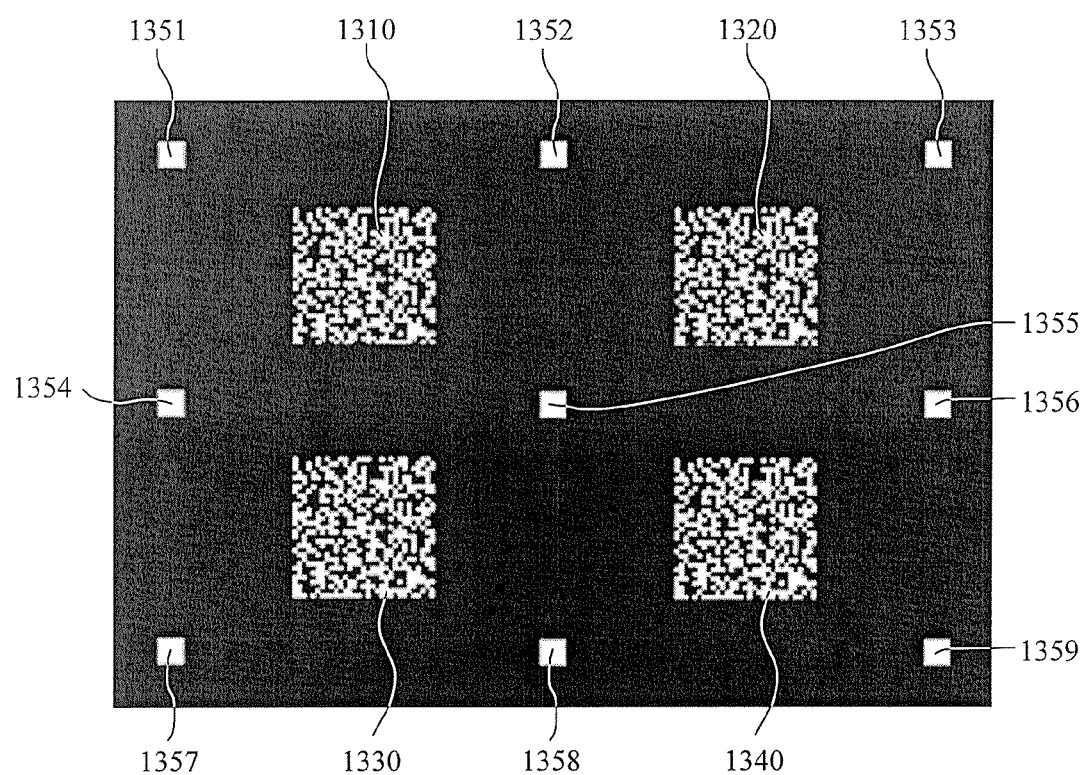
FIG. 13 illustrates a test image according to the third embodiment of the present invention.

To deal with the variation of the PSFs off axis, in an embodiment, a plurality of identification patterns and a plurality of reference marks may be disposed in the test image, as the identification patterns 1310, 1320, 1330, and 1340 and the reference marks 1351, 1352, 1353, 1354, 1355, 1356, 1357, 1358, and 1359 in the test image 1300 illustrated in FIG. 13. The reference marks 1351~1359 provides reference positions to the image correction processing module 1022 for correcting image distortion due, for example, to the field curvature effect induced by the optical system. The image correction includes a spatial correction or a distortion correction. Regarding such a test image, the identification pattern capturing module 1024 respectively captures the identification patterns 1310~1340 in the first image information, and captures the identification pattern information in the corrected second image information, and the filter calculation module 1026 respectively calculates at least a set of parameters of a restoration filter for each region of the second image information containing an identification pattern. Each said parameters are computed according to each individual identification pattern of the first image information and each corresponding individual identification pattern of the corrected second image information. The calculated restoration filters are then used for performing image restoration on the corresponding regions, respectively.

Figure 14:
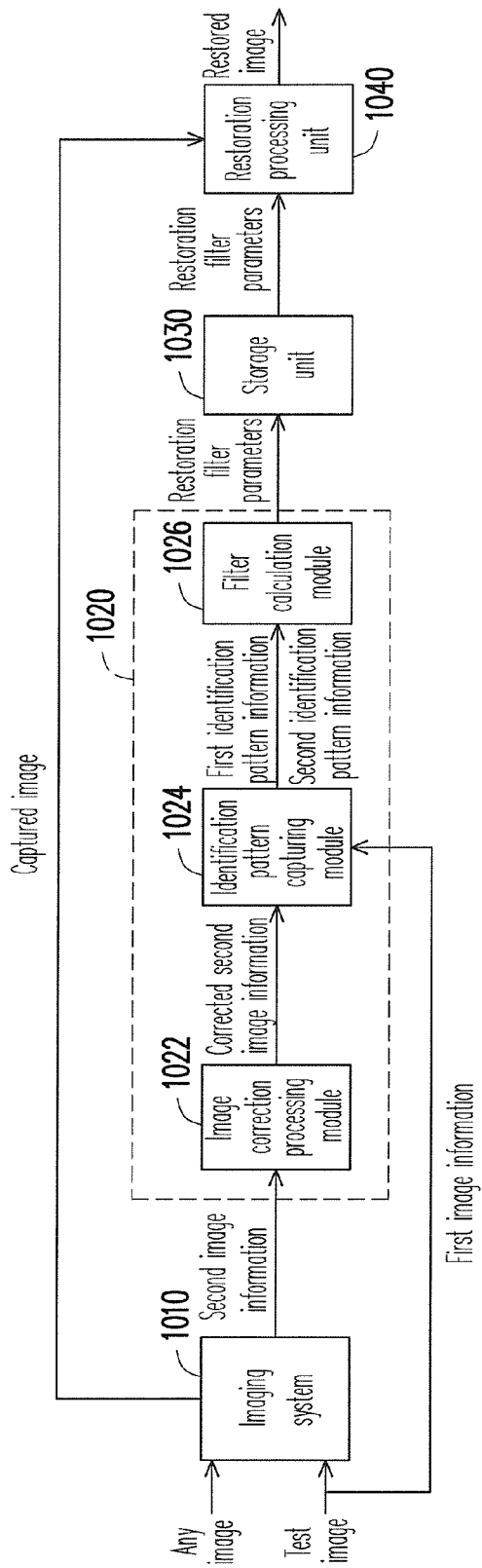
FIG. 14 is a block diagram of an image restoration apparatus according to the third embodiment of the present invention.
Figure 15:
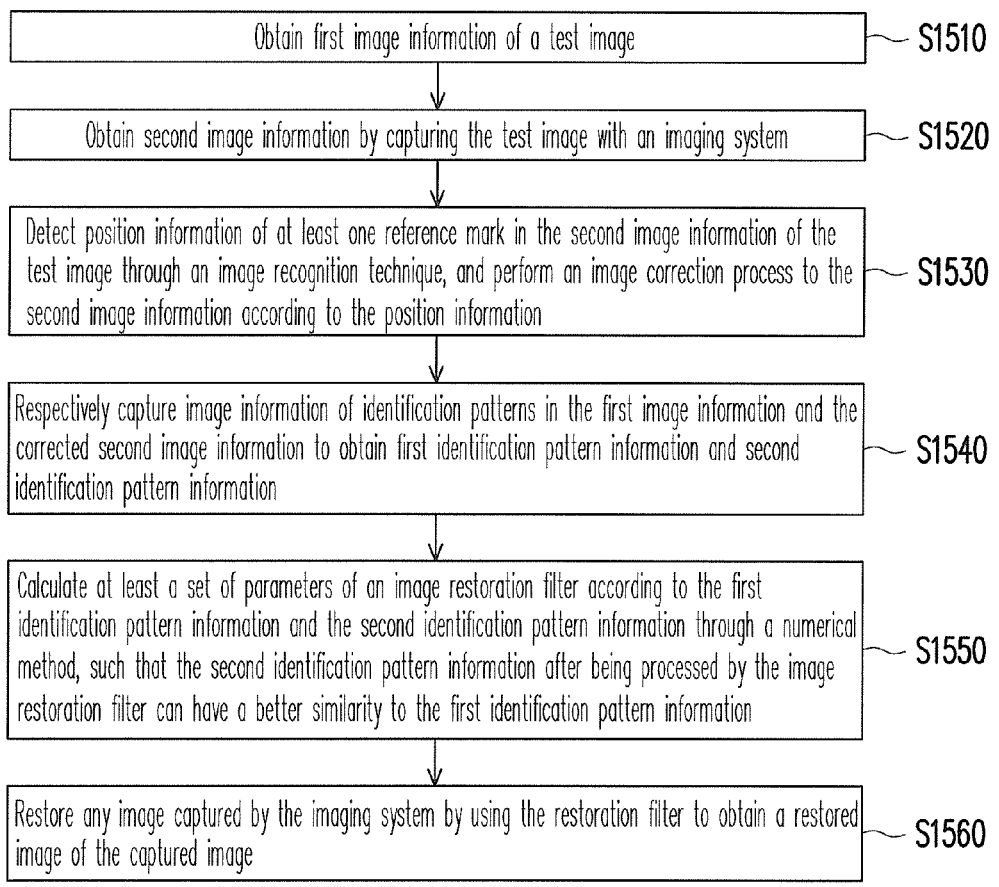
FIG. 15 is a flowchart of an image restoration method according to the third embodiment of the present invention.

As described in the first embodiment, in the present embodiment, the restoration filter stored in the storage unit 1030 can be further loaded into a restoration processing unit to form an image restoration apparatus, wherein the image restoration apparatus is used for restoring images captured by the imaging system 1010. FIG. 14 is a block diagram of an image restoration apparatus according to the third embodiment, and FIG. 15 is a flowchart of an image restoration method according to the third embodiment. Referring to both FIG. 14 and FIG. 15, in the present embodiment, the restoration filter design apparatus 1000 and the restoration processing unit are integrated into a single unit for designing a restoration filter and restoring images. The image restoration method will be described in detail with reference to various components of the image restoration apparatus illustrated in FIG. 14.

First, in a stage of designing a restoration filter, first image information of a test image is obtained (step S1510), and the first image information is sent to an identification pattern capturing module 1024. The first image information may be an original test image file received externally which contains the pixel values of a plurality of pixels in the test image.

On the other hand, the image correction processing module 1022 obtains the second image information by capturing the test image 1200 with the imaging system 1010 (step S1520) and performs an image correction process to the second image information (step S1530).

Then, the identification pattern capturing module 1024 respectively captures image information of the identification pattern 1250 from the first image information and the corrected second image information, so as to obtain first identification pattern information and second identification pattern information (step S1540). The filter calculation module 1026 calculates at least a set of parameters of a restoration filter according to the first identification pattern information and the second identification pattern information through a numerical method, such that the second identification pattern information after being processed by the restoration filter has a better similarity to the first identification pattern information (step S1550), and the filter calculation module 1026 stores the parameters of the restoration filter into the storage unit 1030.

An image restoration stage is entered after the restoration filter is designed. Herein, a restoration processing unit 1040 loads the parameters of the restoration filter from the storage unit 1030 and receives an image captured by the imaging system 1010 to restore this image. Eventually, a restored image is obtained (step S1560). Accordingly, in the present embodiment, the image restoration apparatus can eliminate the blur and noises in the image captured by the imaging system 1010 by using the restoration filter so as to make the restored image more similar to the original image. As a result, the image blur and noise can be reduced.

As described above, foresaid embodiments provide a method and an apparatus for designing a restoration filter and a method and an apparatus for restoring an image by using the restoration filter. In the present embodiments, an image of a test image is captured, and a spatial correction or a distortion correction is performed to the captured image by using reference marks. After that, identification patterns are captured from the corrected image and the original information of the test image obtained a priori, and parameters of the restoration filter are computed with a restoration filter design means according to the identification patterns. Eventually, an image captured by an imaging system is restored by using the restoration filter. Thereby, problems caused by an optical system or an imaging system, such as image blur and incorrect focusing, can be resolved.

It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims and their equivalents.

What is claimed is:

1. A method for designing an image restoration filter of an imaging system, comprising:

obtaining first image information of a test image, wherein the first image information comprises pixel values of a plurality of pixels in the test image and the test image comprises at least one reference mark;

obtaining second image information by capturing the test image from an image sensor of the imaging system;

detecting position information of each reference mark in the second image information through an image recognition technique;

performing an image correction process to the second image information according to the position information of the reference mark; and obtaining the image restoration filter according to the first image information and the second image information through a numerical method such that the second image information after being processed by the image restoration filter has a better similarity to the first image information.

2. The method according to claim 1, wherein in the step of obtaining image restoration filter according to the first image information and the second image information through the numerical method, the numerical method comprises:

calculating an autocorrelation matrix $R_{BB}$ and a cross-correlation vector $\bar{r}_{IB}$ according to the first image information of the test image and the second image information; and calculating the image restoration filter $\bar{w}$ based on a minimum mean square error (MMSE) method with $\bar{w}=R_{BB}^{-1}\bar{r}_{IB}$.

3. The method according to claim 1, wherein before the step of obtaining the second image information by capturing the test image with the imaging system, the restoration filter design method further comprises:

printing the test image by using the first image information of the test image and providing the printed test image for the imaging system to capture.

4. The method according to claim 1, wherein the step of obtaining the second image information by capturing the test image comprises:

obtaining a plurality of image information by capturing the test image a plurality of times with the imaging system, and averaging the image information to obtain the second image information of the test image.

5. The method according to claim 1, wherein the first image information and the second image information are gray scales, RGB, YUV, Luv, YIQ, or any other color space values.

6. The method according to claim 1, wherein the test image comprises at least an identification pattern.

7. The method according to claim 6, wherein after the step of obtaining the second image information by capturing the test image, the method further comprises:

respectively capturing image information of the identification pattern in the first image information and the second image information to obtain first identification pattern information and second identification pattern information; and calculating at least a set of parameters of the image restoration filter according to the first identification pattern information and the second identification pattern information through the numerical method, such that the second identification pattern information after being processed by the image restoration filter has the better similarity to the first identification pattern information.

8. The method according to claim 7, wherein in the step of calculating at least a set of parameters of the image restoration filter according to the first identification pattern information and the second identification pattern information through the numerical method, the numerical method comprises:

calculating an autocorrelation matrix $R_{BB}$ and a cross-correlation vector $\bar{r}_{IB}$ according to the first identification pattern information and the second identification pattern information; and calculating the image restoration filter $\bar{w}$ based on a MMSE method with $\bar{w}=R_{BB}^{-1}\bar{r}_{IB}$.

9. The method according to claim 7, wherein appearance of the identification pattern comprises dot, line, rectangle, circle, polygon, or other geometrical shape, color of the identification pattern comprises black/white, gray scale, or multicolor, and the identification pattern is constructed by using pseudo-random data.

10. The method according to claim 9, wherein the test image comprises a plurality of identification patterns and after the step of obtaining the second image information by capturing the test image, the method further comprises:

respectively capturing image information of each of the identification patterns in the first image information and the second image information to obtain a plurality of first identification pattern information and a plurality of second identification pattern information; and respectively calculating at least a set of parameters of the image restoration filter for each region of the second image information containing an identification pattern according to each individual identification pattern of the first identification pattern information and each corresponding individual identification pattern of the second identification pattern information through the numerical method, such that each of the second identification pattern information after being processed by the image restoration filter for the region of the second identification pattern information has the better similarity to its corresponding first identification pattern information.

11. The method according to claim 1, wherein the image correction process comprises a spatial correction or a distortion correction.

12. The method according to claim 1, wherein the numerical method for calculating the image restoration filter comprises a MMSE method, an iterative least mean square (ILMS) method, a minimum distance (MD) method, a maximum likelihood (ML) method, or a maximum entropy (ME) method.

13. The method according to claim 1, wherein in the step of obtaining image restoration filter according to the first image information and the second image information through the numerical method, the numerical method comprises:

calculating an autocorrelation matrix $R_{BB}$ and a cross-correlation vector $\bar{r}_{IB}$ according to the first image information of the test image and the second image information; and calculating the image restoration filter $\bar{w}$ based on a MMSE method with $\bar{w}=R_{BB}^{-1}\bar{r}_{IB}$.

14. A restoration filter design apparatus, comprising:

a calculation unit configured to receive a first image information of a test image and a second image information obtained by capturing the test image from an image sensor of an imaging system, and obtain at least a set of parameters of an image restoration filter according to the first image information and the second image information through a numerical method, such that the second image information after being processed by the image restoration filter has a better similarity to the first image information, wherein the calculation unit comprises:

an identification pattern capturing module configured to respectively capture image information of at least an identification pattern in the first image information and the second image information, so as to obtain first identification pattern information and second identification pattern information;

a filter calculation module configured to calculate at least a set of parameters of the image restoration filter according to the first identification pattern information and the second identification pattern information through the numerical method, such that the second identification pattern information after being processed by the image restoration filter has the better similarity to the first identification pattern information; and an image correction processing module configured to detect at least one position information of at least one reference mark in the second image information and perform an image correction process to the second image information according to the position information of the reference mark, such that the identification pattern capturing module is configured to respectively capture image information of the identification pattern in the first image information and the corrected second image information; and a storage unit, coupled to the calculation unit, configured to record the parameters of the image restoration filter calculated by the calculation unit.

15. The apparatus according to claim 14, wherein the calculation unit is configured to receive the first image information of the test image and the second image information obtained by capturing the test image from the image sensor of the imaging system and obtain at least a set of parameters of the image restoration filter according to the first image information and the second image information through the numerical method, and the numerical method comprises calculating an autocorrelation matrix $R_{BB}$ and a cross-correlation vector $\bar{r}_{IB}$ according to the first image information of the test image and the second image information and calculating the image restoration filter $\bar{w}$ based on a MMSE method with $\bar{w}=R_{BB}^{-1}\bar{r}_{IB}$.

16. The apparatus according to claim 14 further comprising:

the imaging system configured to capture the test image and provide the second image information.

17. The apparatus according to claim 16, further comprising:

a test image rendering unit configured to print the test image by using the first image information of the test image and provide the printed test image for the imaging system to capture.

18. The apparatus according to claim 14, wherein the calculation unit receives a plurality of pieces of image information obtained by capturing the test image a plurality of times and averages the plurality of pieces of image information to obtain the second image information of the test image.

19. The apparatus according to claim 14, wherein the filter calculation module is configured to calculate at least a set of parameters of the image restoration filter according to the first identification pattern information and the second identification pattern information through the numerical method, and the numerical method comprises calculating an autocorrelation matrix $R_{BB}$ and a cross-correlation vector $\bar{r}_{IB}$ according to the first identification pattern information and the second identification pattern information and calculating the image restoration filter $\bar{w}$ based on a MMSE method with $\bar{w}=R_{BB}^{-1}\bar{r}_{IB}$.

20. The apparatus according to claim 14, wherein the identification pattern capturing module further respectively captures image information of a plurality of identification patterns in the first image information and the second image information, so as to obtain a plurality of first identification pattern information and a plurality of second identification pattern information, and the filter calculation module further respectively calculates at least a set of parameters of the image restoration filter for each region of the second image information containing an identification pattern according to each individual identification pattern of the first identification pattern information and each corresponding individual identification pattern of the second identification pattern information through the numerical method, such that each of the second identification pattern information after being processed by the image restoration filter for the region of the second identification pattern information has the better similarity to its corresponding first identification pattern information.

21. The apparatus according to claim 14, wherein the filter calculation module is configured to calculate at least a set of parameters of the image restoration filter according to the first identification pattern information and the corrected second identification pattern information through the numerical method, and the numerical method comprises calculating an autocorrelation matrix $R_{BB}$ and a cross-correlation vector $\bar{r}_{IB}$ according to the first identification pattern information and the second identification pattern information and calculating the image restoration filter $\bar{w}$ based on a MMSE method with $\bar{w}=R_{BB}^{-1}\bar{r}_{IB}$.

22. The apparatus according to claim 14, wherein the image correction process comprises a spatial correction or a distortion correction.

23. The apparatus according to claim 14, wherein appearance of the identification pattern comprises dot, line, rectangle, circle, polygon, or other geometrical shape, color of the identification pattern comprises black/white, gray scale, or multicolor, and the identification pattern is constructed by using pseudo-random data.

* * * * *